United States Patent [19]

Bright et al.

[11] 4,072,325
[45] Feb. 7, 1978

[54] PENDULUM STABILIZED GROUND VEHICLES

[75] Inventors: Jerd Bright; Donald Ray Bright, both of Sunnyvale, Calif.

[73] Assignee: Bright Engineering, Incorporated, Sunnyvale, Calif.

[21] Appl. No.: 763,681

[22] Filed: Jan. 28, 1977

[51] Int. Cl.$^2$ .............................................. B62D 9/00
[52] U.S. Cl. ................................... 280/772; 280/6.1; 180/25 R
[58] Field of Search ...................... 280/772, 112 A, 91, 280/96.2; 180/25 R

[56] References Cited

U.S. PATENT DOCUMENTS

| | | | |
|---|---|---|---|
| 2,623,758 | 12/1952 | Cruz | 280/6.1 |
| 3,601,213 | 8/1971 | Patin | 180/27 |
| 3,820,809 | 6/1974 | Blonar | 280/772 |

*Primary Examiner*—Philip Goodman

[57] ABSTRACT

A device for automatically stabilizing moving ground vehicles against the effects of transverse acceleration forces and roll moments, due to turning maneuvers, by means of an on-board pendulum, suspended from a stable platform, part of the vehicle, and intercoupled to pivotally supported vehicle ground wheels, acting so as to incline the planes of rotation of the pivotally supported ground wheels of the vehicle to the angle of the vector resultant of the gravitational force component acting on the pendulum and the transverse acceleration force component acting on the pendulum; the device thereby provides, within the design maximum angle of inclination of the ground wheels and the adhesion capability of the tires on the roadbed, essentially complete stabilization of the turning vehicle. The stabilizing effect is that the angle of the force vector resultant acting on the vehicle will nominally be that of the planes of rotation of the ground vehicle wheels, excepting small steering and suspension system deviations that may act on the steerable ground wheels or wheel. The vehicle is designed such that any transverse forces acting on the vehicle automatically cause the vehicle to lean, bank, or rotate about the longitudinal axis, much as a conventional two-wheeled motorcycle leans on a turn, thereby establishing the necessary angle of inclination required to balance the gravitational forces present and the inertial forces generated by the turning maneuvers.

8 Claims, 9 Drawing Figures

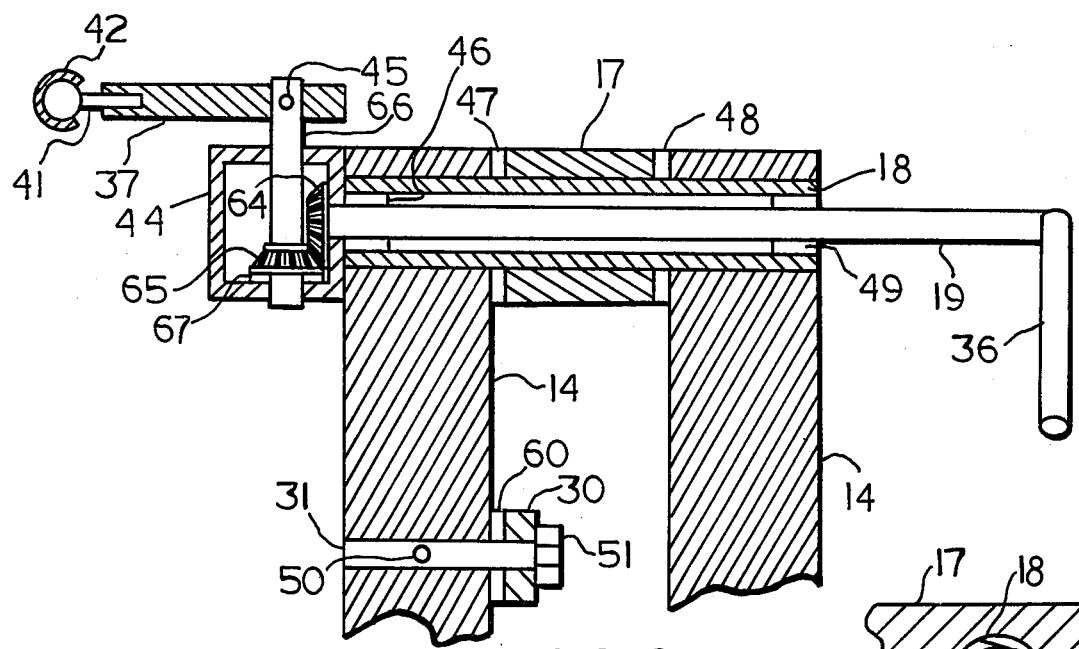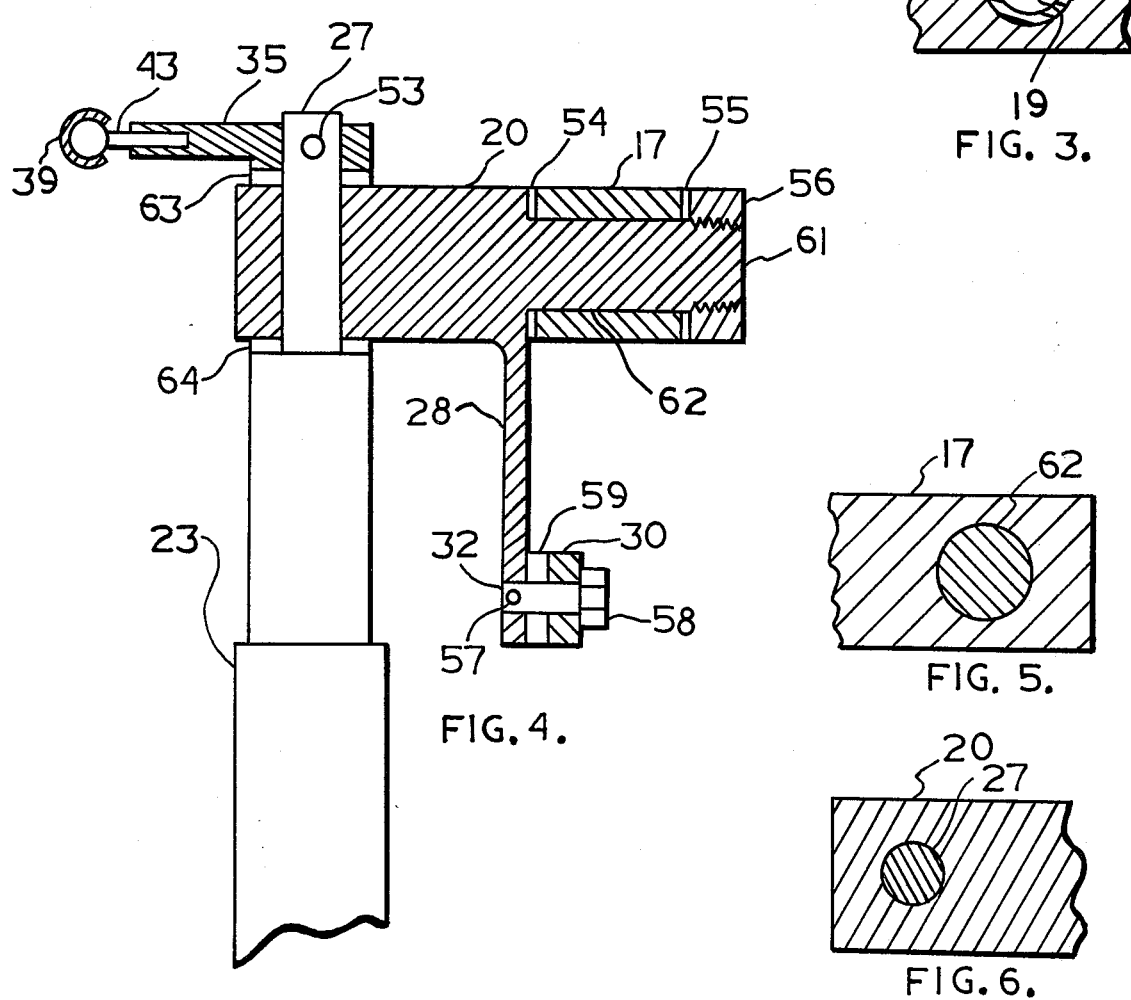

PENDULUM STABILIZED GROUND VEHICLES

BRIEF SUMMARY OF THE INVENTION

The present invention relates to vehicles and, more particularly, to new and improved three-wheeled vehicles and balance suspension system therefore, wherein means are provided to constantly and automatically incline the planes of rotation of the ground wheels of the vehicle to the nominal angle of the vector resultant of the combined gravitational force and the transverse acceleration force acting on the vehicle at any time, such adjustments to wheel angle of inclination being limited to a maximum angle determined by the design of the particular vehicle under consideration. An essential feature of the vehicle is a pendulum affixed to the vehicle in such a manner that it is sensitive and responsive to both the gravitational acceleration force and the transverse acceleration force acting upon the vehicle. Provision is made for suspending the pendulum from the vehicle in such a manner that the pendulum support remains nominally in a plane parallel to the general plane of the roadbed or ground being traversed. Provision is also made to intercouple the pendulum to the vehicle road wheels in such a manner that the angular position of the pendulum about a nominal longitudinal centerline of the vehicle determines the angle of the planes of of rotation of the ground wheels with respect to the pendulum support of the vehicle, and hence, with respect to the roadbed.

The exemplary construction of the vehicle suspension system briefly referred to in the foregoing makes possible a number of improvements in efficiency, utility, and safety of the ground vehicles. Since the gravitational and transverse acceleration forces acting on this vehicle are constantly balanced automatically by the stable pendulum, the vehicle remains in stable equilibrium through all operational attitudes if design maximum wheel angle limits, tire to roadbed adhesion limits, and the tire tread maximum allowable lateral force limits are not exceeded. This advantage relieves the vehicle operator of the need to continually establish the proper vehicle balance attitude by manual control of a vehicle that is normally, for two-wheeled vehicles, in a state of neutral or unstable equilibrium. Thus, this vehicle can be operated safely near maximum capability by relatively unskilled operators.

A further objective is to realize an improvement in vehicle stability by concentrating a large part of the mass of the vehicle such as body, running gear, fuel, operator and passengers, if any, in the suspended pendulum element of the vehicle. This feature allows a very low center of mass and makes available relatively large lateral forces for the positioning of the ground wheels to the required angle through the motion of the pendulum.

A further object is to realize a mechanism for intercoupling the pendulum to the ground wheel support pivotal supports of the vehicle by means of mechanical linkages consisting of rods, tubes, pin, bearing, pivot joints, and other mechanical elements.

A further object is to realize a mechanism for intercoupling the pendulum mounted steering device to the ground wheel supports of the vehicle by means of mechanical linkages consisting of rods, tubes, pins, bushings, pivot joints and other mechanical elements.

A further object is to realize a steering device that intercouples the steerable ground wheel supports of the vehicle to the pendulum by means of a steering control device, such as a steering handlebar, steering wheel, or tiller, in such a manner that the leaning or banking movements of the steerable ground wheel suspension does not cause a change in the relative position of the steering control and the suspended pendulum. This feature is essential to the invention at hand to prevent the leaning motions of the vehicle from introducing motions into the steering control not related to steering functions, which might seriously complicate the operation of the vehicle.

A still further object and advantage is to realize a vehicle that has the beneficial high speed cornering attributes of a two-wheeled motorcycle through its ability to bank or lean on turns, but which, unlike a two-wheeled motorcycle, cannot fall over on its side, either at rest or in turns at speed, or at any other attitude of normal operation. This attribute allows the pendulum stabilized vehicle to be used on roadbeds that conventional motorcycles cannot safely be operated upon such as roadbeds having loose gravel or particulate matter, water, ice, snow, oil, or other materials that could cause a loss of traction on the surface; or during inclement weather.

Yet another object and advantage is to realize a banking or leaning motorcycle-type vehicle that is not dependent upon critical vehicle balance being effected by the operator shifting the mass of his body so as to upset the unstable or neutral equilbrium of the vehicle. This advantage, therefore, allows the operator and passengers, if any, to be taken into the vehicle rather than to sit on top of the vehicle, thereby lowering the vehicle overall center of mass and placing the operator and passengers in a location in the vehicle wherein they can be protected by safety belts, safety harness, roll-bars, or other protective devices not available to a top-seated operator or passenger, and where, in the event of accident or vehicle malfunction, or if the vehicle is overturned, they will be protected by the vehicle rather than being thrown from it and perhaps endangered by it.

A still further object and advantage that is realized is that placing the fuel storage tank in the pendulum removes it from the conventional high, exposed location and places it in a well protected location in the bottom of the vehicle where it can be contained and surrounded by primary frame structure for additional safety.

BRIEF DESCRIPTION OF THE DRAWINGS

Further objects, features, and advantages of the present invention will become more apparent from the following description when taken in connection with the accompanying drawing which shows, for purposes of illustration only, one embodiment in accordance with the present invention, and wherein:

FIG. 2 is an enlarged fragmentary longitudinal section taken along the line 2—2 in FIG. 1, showing the pivot joint coupling of the pendulum, the suspension frame, and the steering device;

FIG. 3 is an enlarged fragmentary transverse section taken along line 3—3 in FIG. 1, showing the pivot joint coupling of the pendulum, the suspension frame, and the steering device;

FIG. 4 is an enlarged fragmentary longitudinal section taken along the line 4—4 in FIG. 1, showing the compound pivot joint coupling of the suspension frame and the front ground wheel support pivotal support, and of the front ground wheel pivotal support and the front ground wheel support; also shown are the front ground wheel leaning arm and the front ground wheel steering arm;

FIG. 5 is an enlarged fragmentary transverse section taken along the line 5—5 in FIG. 1, showing the leaning pivot joint coupling of the suspension frame and the front ground wheel support pivotal support;

FIG. 6 is an enlarged fragmentary transverse section taken along the line 6—6 in FIG. 1, showing the steering pivot joint coupling of the front ground wheel support pivotal support and the front ground wheel support;

DETAILED DESCRIPTION OF THE PREFERRED EMBODIMENT OF INVENTION

Figure 1:
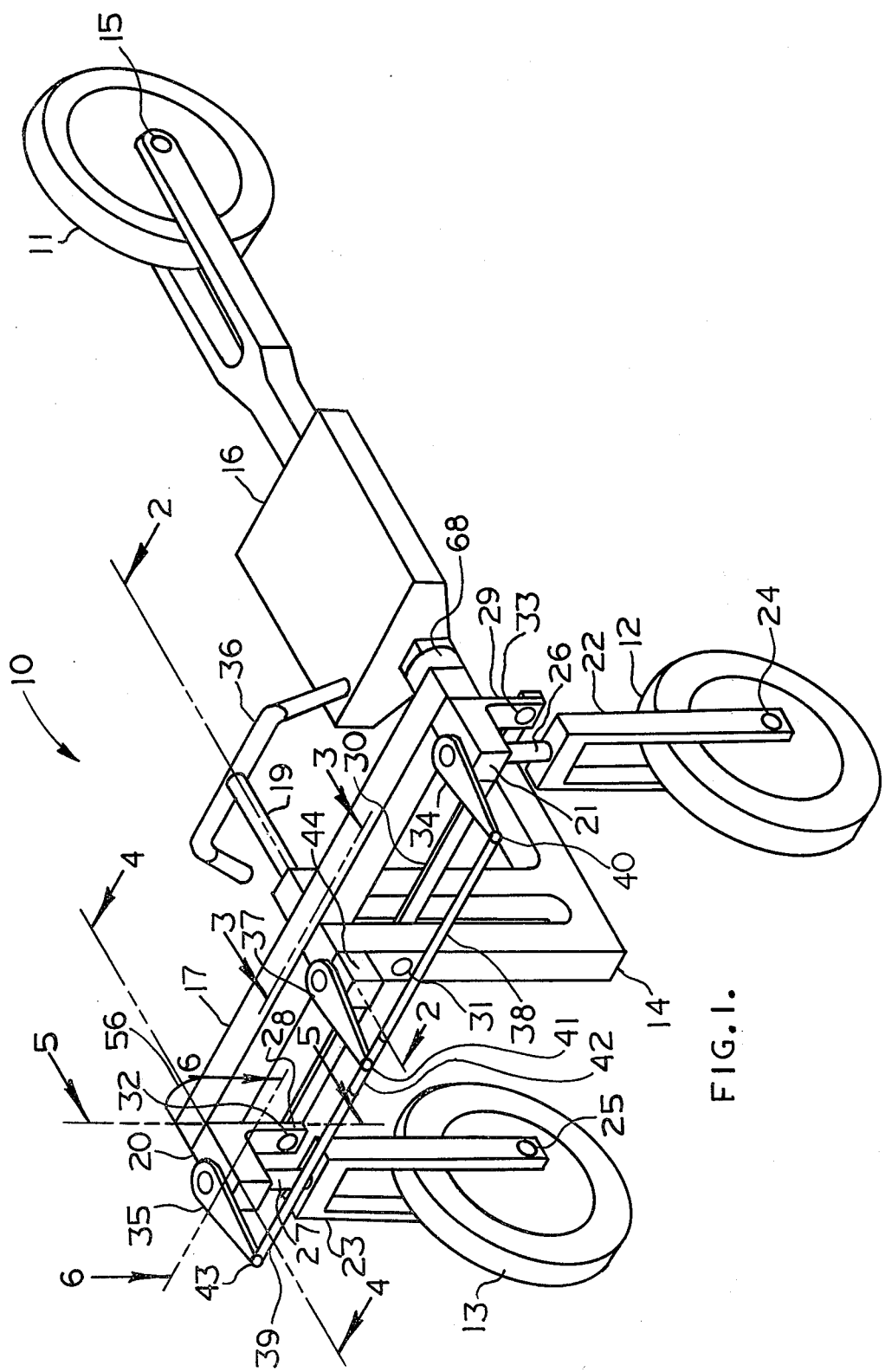
FIG. 1 is a perspective view of a vehicle incorporating the principles of the present invention.

In FIG. 1 vehicle 10 is shown to include a rear ground wheel 11 and also a pair of front ground wheels 12 and 13. A pendulum 14 is also provided so formed that its rear extremity provides a support for pivotal attachment of the rear ground wheel 11 by means of rear ground wheel axle 15. Further, a generalized pendulum mass 16 is shown secured to said pendulum 14, and represents mass effects normally present in vehicle components, bodywork, operator and passenger(s), drivetrain, fuel, and the like. A suspension frame 17 is provided and is centrally attached to said pendulum 14 by means of pivot journal 18, not shown, installed through matching bores of said pendulum 14 and said suspension frame 17, orientation of the pivot joint so effected being generally parallel to the longitudinal axis of said vehicle 10, so as to provide a transverse leaning capability of said pendulum 14. A central bore is provided in said pivot journal 18, not shown, for pivotal support of steering shaft 19. The extremities of said suspension frame 17 are provided with cylindrically bored holes oriented in general parallel to the longitudinal axis of said vehicle 10 for pivotally supporting a pair of front ground wheel support pivotal supports 20 and 21, these joints so effected provide front ground wheel leaning capability. Said front ground wheel support pivotal supports 20 and 21 are in turn each provided with cylindrically bored holes oriented in general parallel to the compound angle formed by combining the vehicle front ground wheel caster angle and the vehicle front ground wheel camber angle. Further, said front ground wheels 12 and 13 are pivotally attached to front ground wheel supports 22 and 23 respectively by means of front ground wheel axles 24 and 25 respectively. In addition, said front ground wheel supports 22 and 23 are provided with cylindrical shafts 26 and 27 respectively that are pivotally secured respectively into the above mentioned cylindrical bores of said front ground wheel support pivotal supports 21 and 20, these joints so effected provide front ground wheel steering capability. Said front ground wheel support pivotal supports 20 and 21 are further provided with leaning arms 28 and 29 respectively, projecting downwardly, and pivotally intercoupled to said pendulum 14 by means of intercoupling link 30 pivotally secured to said pendulum 14 by pivot-stud 31 and to leaning arms 28 and 29 by pivot-studs 32 and 33 respectively. The above arrangement of links and joints comprise a parallelogram frame permitting variable side member angle but fixing base and top member angles, and provide the capability of said vehicle 10 to lean on turns. Continuing, said front ground wheel support cylindrical shafts 27 and 26 protrude upwardly through the cylindrical bores provided in said front ground wheel support pivotal supports 20 and 21 respectively, and the protruding shaft extremities are provided with securely affixed steering arms 35 and 34 respectively, in general projecting forward from said shafts. Steering is provided by handlebar 36 attached securely to rear extremity of aforementioned steering shaft 19, the forward extremity of steering shaft 19 being coupled to gearbox 44 in such a manner that rotation of handlebar 36 rotates steering shaft 19 which acts through gearbox 44 causing rotation of steering arm 37 which is attached to the output shaft of said gearbox. In addition, steering arm 37 is intercoupled to front ground wheel steering arms 34 and 35 by means of links 38 and 39 respectively; link 38 is attached to steering arm 34 by means of pivot joint 40 and to steering arm 37 by means of double rod end 42 and pivot joint 41; link 39 is attached to steering arm 35 by means of pivot joint 43 and to steering arm 37 by means of double rod end 42 and pivot joint 41. This arrangement of links, arms, and shafts provide steering capability for vehicle 10.

FIG. 2 is longitudinal midplane section showing details of the pendulum pivotal support pivot joint, the intercoupling link attachment, and the steering device. Said pivot joint is comprised of pendulum 14, suspension frame 17, pivot journal 18, thrust bearings 47 and 48, and cylindrical bearings 46 and 49. Pivot journal 18 is press fitted into the cylindrical bores provided in pendulum 14, but sized to the central cylindrical bore of suspension frame 17 so as to allow said pendulum to pivot freely. Thrust bearings 47 and 48 allow pendulum 14 to pivot freely while being subjected to acceleration or deceleration loading of said joint. The intercoupling link attachment to the pendulum is comprised of intercoupling link 30 and pendulum 14, joined by means of pivot-stud 31 secured to pendulum 14 by means of drive-pin 50 and secured by locknut 51. Thrust bearing 60 is provided between intercoupling link 30 and pendulum 14 to allow low friction actuation of said pivot joint. The steering device is comprised of handlebar 36 attached securely to steering shaft 19 which is supported in the central bore of pivot journal 18 by cylindrical bearing 46 and 49, the forward extremity of said steering shaft 19 is provided with bevel gear 64, a part of gearbox 44, which drives bevel gear 65, which is supported by thrust bearing 67, and which drives gearbox output shaft 66 attached to steering arm 37 by drive pin 45, steering arm 37 terminating at the forward extremity with double rod end 42 acting through mating pivot joint 41. Rotation of handlebar 36 by operator causes steering shaft 19 to rotate in bearings 46 and 49, and causes rotation of gearbox 44 input bevel gear 64, which causes rotation of output bevel gear 65, which causes rotation of gearbox output shaft 66, which in turn rotates steering arm 37, which, acting through pivot joints 41 and double rod end 42, causes steering links 38 and 39, not shown, to translate in a direction generally transverse to vehicle 10. FIG. 3 is a transverse section through the pendulum pivotal support pivot joint showing the arrangement and relationship of suspension frame 17, pivot journal 18, and steering shaft 19. This arrangement allows the pendulum 14 to swing freely in response to any transverse acceleration acting on vehicle 10.

FIG. 4 is a longitudinal section showing details of a typical front ground wheel support pivotal support pivot joint, the intercoupling link attachment, and the front wheel support steering pivot joint. The front ground wheel support pivotal support pivot joint is comprised of suspension frame 17, front ground wheel support pivotal support 20, cylindrical shaft 62, shaft threaded section 61, locknut 56, and thrust bearings 54 and 55. Cylindrical shaft 62 is pivotally attached to the extremity of suspension frame 17 by means of a cylindrical bore provided, and secured by locknut 56 on shaft threaded section 61. Thrust bearings 54 and 55 are provided to allow front ground wheel support pivotal support 20 to pivot freely while being subjected to acceleration or deceleration loading of said joint. The intercoupling link attachment to the front ground wheel support pivotal support 20 is comprised of intercoupling link 30 and front ground wheel support pivotal support leaning arm 28, joined by means of pivot-stud 32 secured to leaning arm 28 by means of drive-pin 57 and secured by locknut 58. Thrust bearing 59 is provided between intercoupling link 30 and leaning arm 28 to allow low friction actuation of the pivot joint. The front wheel support steering pivot joint is comprised of front ground wheel support 23, front ground wheel support pivotal support 20, cylindrical shaft section 27, thrust bearings 63 and 64, steering arm 35, pivot joint 43, link 39, and drive-pin 53. Front ground wheel support 23 is provided with a cylindrical shaft section 27, at its upward extremity, which is pivotally attached to a cylindrical bore provided in the forward section of front ground wheel support pivotal support 20. Steering arm 35 is attached to upper extremity of cylindrical shaft 27 through a cylindrical bore provided, and secured by means of drive-pin 53. The forward extremity of steering arm 35 terminates with pivot joint 43 attached to link 39. Thrust bearing 63 is provided between the upward face of front ground wheel support pivotal support 20 and downward face of steering arm 35; thrust bearing 64 is provided between the downward face of front ground wheel support pivotal support 20 and the upward face of ground wheel support 23. Said thrust bearings 63 and 64 permit the cylindrical shaft section 27 to pivot freely, as required for vehicle 10 steering, while said pivot joint is subjected to various service loading conditions present.

FIG. 5 is a transverse section through the front ground wheel support pivotal support leaning pivot joint showing the arrangement and relationship of cylindrical shaft 62, and the extremity of suspension frame 17. This arrangement allows the front ground wheel support pivotal support 20 to swing freely in response to transverse motion of the intercoupled pendulum 14.

FIG. 6 is a transverse section through the front ground wheel support pivotal support steering pivot joint showing the arrangement and relationship of front ground wheel support pivotal support 20, and the ground wheel support cylindrical shaft section 27. This arrangement allows the front ground wheel support to rotate freely in response to transverse steering translations of link 39.

Figure 7:
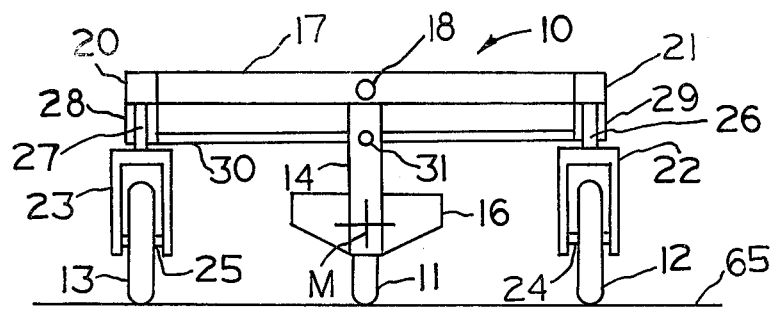
FIG. 7 is a front view of the exemplary vehicle showing the attitude of the vehicle while at rest or traveling in a straight line direction on a level roadbed.
Figure 8:
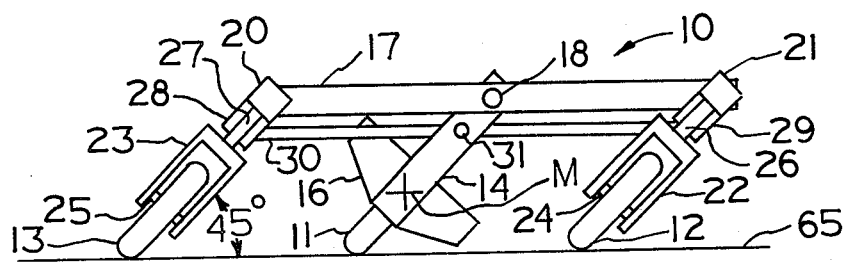
FIG 8 is a front view of the exemplary vehicle showing the attitude of the vehicle while negotiating a 1 g acceleration force turn on a level roadbed.
Figure 9:
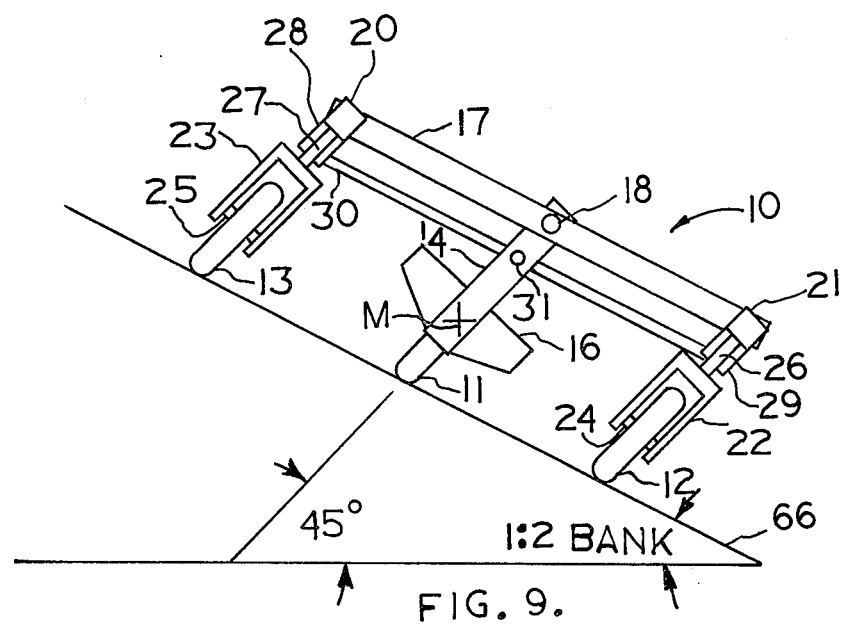
FIG. 9 is a front view of the exemplary vehicle showing the attitude of the vehicle while negotiating a 1 g transverse acceleration force turb on a roadbed banked at a 1:2 ratio of roadbed projected height to roadbed width.

FIG. 7-9 show frontal views of the leaning mechanism of vehicle 10 in various leaning attitudes due to various lateral acceleration forces applied to the vehicle as it operates on variously banked roadbeds. FIG. 7 shows vehicle 10 leaning attitude while at rest or traveling in a straight line on a level roadbed 65. FIG. 8 shows vehicle 10 leaning attitude while negotiating a 1 g lateral acceleration force turn on a level roadbed 65. It should be noted that the 45° leaning attitude balances the 1 g lateral acceleration force and the 1 g downward acceleration force due to gravity. FIG. 9 shows the vehicle 10 leaning attitude while negotiating a 1 g lateral acceleration force turn on a 1:2 ratio banked roadbed 66. It should be noted that the lean angle of vehicle 10 is 45° to the horizontal although the suspension frame 17 and intercoupling link 30 are parallel to the surface of the banked roadbed 66; hence, vehicle 10 will lean to balance the lateral acceleration forces present independent of the bank angle of such roadbeds as it operates upon. It should also be noted that rapid changes in lateral acceleration forces or in the bank ratio of the roadbed, or superimposition of pitching inertial forces on the nominal 1 g acceleration force of gravity, such as might be caused by abrupt changes in roadbed grade, will automatically and constantly be compensated for by the leaning mechanism of this invention. The leaning mechanism of the present invention is comprised of rear ground wheel 11 pivotally supported from rear extremity of pendulum 14 which is pivotally supported by pivot journal 18 attached to suspension frame 17 which is pivotally supported by front ground wheel support pivotal supports 20 and 21 which provide leaning arms 28 and 29 respectively which are pivotally attached to the extremities of intercoupling link 30 which is centrally attached to pendulum 14 by means of pivot-stud 31; front ground wheels 12 and 13 are pivotally attached to front ground wheel supports 22 and 23 respectively by means of front ground wheel axles 24 and 25 respectively; front ground wheel supports 22 and 23 are in turn pivotally attached to front ground wheel support pivotal supports 21 and 20 respectively by means of ground wheel support cylindrical shaft sections 26 and 27 respectively. The nominal location of the center of mass of vehicle 10 is designated M in these figures.

In contradistinction to the hitherto known systems, the construction according to the present invention involves ground vehicles having three or more ground wheels arranged such that not all ground wheels are collinear, said ground wheels being pivotally supported from the vehicle in such a manner that the motion of a pendulum mounted in or on a suspension frame, part of said vehicle, is capable of causing all elements of the vehicle, excepting the suspension frame and intercoupling links, to automatically lean or bank, during turning manuevers, to the angle of inclination with the roadbed necessary to balance the transverse acceleration forces generated by the turn against the acceleration force of gravity. In contrast thereto, the prior art systems are embodied in either two-wheeled vehicles capable of leaning or banking on turns, but which are not inherently in a state of stable equilibrium; or in vehicles having three or more ground wheels but having no capability for leaning or banking on turns, stabilized by maintaining the overall force vector acting on the vehicle inside of safe bounds, nominally within the tread dimension of the vehicle, and reacting roll moments at the outside wheels during turning manuevers.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all changes and modifications as may be encompassed by the scope of the appended claims.

We claim:

1. A ground vehicle including, in combination, suspension frame means, ground wheel means, ground wheel support means, means coupled to proximate extremities of said suspension frame means for pivotally supporting said ground wheel support means, pendulum means, means centrally coupled to said suspension frame means for pivotally supporting said pendulum means such that said pendulum means depends downwardly from said suspension frame means, means for intercoupling said pivotally supported ground wheel support means and said pivotally supported pendulum means such that motion of said pivotally supported pendulum means transverse to the direction of travel of said vehicle causes a corresponding motion of said pivotally supported ground wheel support means and hence, of said attached ground wheel support means and said ground wheel means.

2. A ground vehicle including in combination, steering device means, suspension frame means, ground wheel means, ground wheel support means, means coupled to proximate extremities of said suspension frame means for pivotally supporting said ground wheel support means, pendulum means, means centrally coupled to said suspension frame means for pivotally supporting said pendulum means such that said pendulum means depends downwardly from said suspension frame means, means for intercoupling said pivotally supported ground wheel support means and said pivotally supported pendulum means in such a manner that motion of said pendulum means due to inertial forces acting on said pendulum means and causing said pendulum means to move transversely in said vehicle will be transferred from said pendulum means to said pivotally supported ground wheel support means, and hence to said ground wheel support means, causing the angle of inclination of said ground wheel means to the ground or roadbed to be positioned to the nominal angle of inclination of said pendulum means to the roadbed; a further means of intercoupling said steering device means, said pivotally supported ground wheel support means, and said pendulum means such that changes in the angle of inclination of said ground wheel means to the roadbed do not cause a change in the relative position of said steering device means referred to said pendulum means.

3. Means for pivotally supporting vehicle ground wheel support means from the proximate extremities of suspension frame means such that said ground wheel support means are capable of pivotal motion about an axis generally parallel to the longitudinal axis of the vehicle, and also are capable of pivotal motion about an axis generally parallel to the combined camber and caster angles of said ground wheel support means; with further means for attachment of pendulum means to ground wheel support means intercoupling means such that transverse motion of said intercoupling means causes rotation of said ground wheel support means about an axis parallel to said vehicle longitudinal axis; with further means for attachment of a steering device to ground wheel support means intercoupling means such that transverse motion of said intercoupling means causes rotation of said ground wheel support means about an axis generally parallel to the combined camber and caster angles of said ground wheel support means.

4. Means for pivotally supporting pendulum means from vehicle suspension frame means such that said pendulum means is capable of pivotal motion about an axis generally parallel to the longitudinal axis of the vehicle; further means for attachment of said pendulum means to ground wheel support means intercoupling means such that transverse motion of said pendulum means causes transverse motion of said intercoupling means in the direction of motion of said pendulum means; further means for attachment of steering device means to said pendulum means such that operation of said steering device means is with respect to said pendulum means; further means for attachment of said steering device means to ground wheel support means intercoupling means such that transverse motion of said pendulum means does not cause transverse motion of said intercoupling means.

5. The structure of claim 1 wherein said means for intercoupling said pivotally supported ground wheel support means and said pivotally supported pendulum means comprise leaning arm means affixed to said ground wheel support pivotal support means, said leaning arm means intercoupled by link means connected to said pendulum means by pivot joint means.

6. The structure of claim 2 wherein said means for intercoupling said steering device means and said pivotally supported ground wheel support means comprise steering arm means affixed to said ground wheel support means and to said steering device means, said steering arm means intercoupled by link means connected to said steering arm means by pivot joint means.

7. The structure of claim 2 wherein said means for intercoupling said steering device means and said pivotally supported pendulum means comprise bearing means internal to, and concentric with the pivot axis of, said pivot means of said pivotally supported pendulum means, said bearing means supporting the outer circumference of steering shaft means of said steering device means.

8. The structure of claim 2 wherein said steering device means comprise handlebar means affixed to steering shaft means, said steering shaft means supported by bearing means internal to and concentric with said pivot means of said pivotally supported pendulum means, said steering shaft means terminated with a coupling means for attachment to steering gearbox means, further means comprised of steering gearbox means mounted on said pendulum means and connected to said steering shaft means, with said gearbox output shaft supporting a steering arm means.

* * * * *